United States Patent
Roh et al.

(10) Patent No.: US 7,558,050 B2
(45) Date of Patent: Jul. 7, 2009

(54) SUPERCAPACITOR WITH REDUCED INTERNAL RESISTANCE

(75) Inventors: Whanjin Roh, Seoul (KR); Seongwoo Park, Kyunggi (KR)

(73) Assignee: Enerland Co., Ltd., Seoul (KR)

( * ) Notice: Subject to any disclaimer, the term of this patent is extended or adjusted under 35 U.S.C. 154(b) by 426 days.

(21) Appl. No.: 10/567,243

(22) PCT Filed: Aug. 6, 2004

(86) PCT No.: PCT/KR2004/001990

§ 371 (c)(1),
(2), (4) Date: Feb. 6, 2006

(87) PCT Pub. No.: WO2005/015587

PCT Pub. Date: Feb. 17, 2005

(65) Prior Publication Data

US 2008/0212260 A1    Sep. 4, 2008

(30) Foreign Application Priority Data

Aug. 6, 2003    (KR) ............. 10-2003-0054336

(51) Int. Cl.
*H01G 9/00* (2006.01)
(52) U.S. Cl. ................... 361/502; 361/503
(58) Field of Classification Search .......... 361/502–503
See application file for complete search history.

(56) References Cited

U.S. PATENT DOCUMENTS 4,783,723 A * 11/1988 Watanabe et al. ........... 361/502
6,579,327 B1    6/2003 Shiue et al.

FOREIGN PATENT DOCUMENTS

| JP | 55-58392 | 5/1980 |
| JP | 55-69291 | 5/1980 |
| JP | 60-182123 | 9/1985 |
| JP | 1-227418 | 9/1989 |
| JP | 2-1104 | 1/1990 |
| JP | 4-42519 | 2/1992 |
| JP | 6-45198 | 2/1994 |
| JP | 10-12503 | 1/1998 |
| JP | 2002-324545 | 11/2002 |

* cited by examiner

*Primary Examiner*—Eric Thomas
(74) *Attorney, Agent, or Firm*—Hoffmann & Baron, LLP

(57) ABSTRACT

There is provided a supercapacitor with a significantly reduced internal resistance. The supercapacitor comprises two electrodes in which each of the two electrodes is comprised of a current collector and an electrode active material adhered to the current collector, a separator positioned between the two electrodes, an electrolyte and a package, wherein the current collector is a metal thin plate having a conductive metal oxide layer thereon and the electrode active material is adhered on a surface of the conductive metal oxide layer. The supercapacitor according to the present invention has a significantly reduced internal resistance and a highly enhanced charge capacitance.

1 Claim, No Drawings

SUPERCAPACITOR WITH REDUCED INTERNAL RESISTANCE

TECHNICAL FIELD

The present invention relates to a supercapacitor, more specifically, to a supercapacitor with reduce internal resistance.

BACKGROUND ART

Supercapacitor is an energy storage device comprising two electrodes, a separator positioned between the two electrodes, an electrolyte and a package. Contrary to a battery that converts a chemical energy to an electrical energy through a redox reaction, the supercapacitor stores energy through surface absorption of charges. In this case, charge absorption takes place in the interface between an electrode and an electrolyte, and the supercapacitor undergoes very fast charge and discharge. An essential element of the supercapacitor is the electrode. The electrode is comprised of an electrode active material and a current collector on which the electrode active material is adhered. The current collector plays a role to conduct electrons. The electrode active material plays a role to absorb charges from the electrolyte. The electrode active material can be adhered to the current collector, for example, by a roller coating, a die molding and a dip coating.

The performance of the supercapacitor depends on a charge capacitance, a voltage and an internal resistance. The charge capacitance highly depends on a charge absorption rate. In order to enhance the charge capacitance, a carbon material having a high specific surface area and a large pore size, a metal oxide such as $RuO_2$, $IrO_2$, $MnO_2$ or $Co(OH)_2$, and a conductive polymer material is used as an electrode active material. Currently, activated carbon is widely used as an electrode active material. In order to accomplish high voltage in a system adopting the electrochemical supercapacitor, serial connection or stacking of unit cells of the electrochemical supercapacitor is adopted. Examples of the attempts to reduce the internal resistance include enhancement of binders (U.S. Pat. Nos. 4,327,400 and 5,150,283) and development of new electrode active materials (U.S. Pat. Nos. 5,079,674 and 6,512,667). Particularly, for the system such as electric vehicles that requires high energy in a short time, it is very important to minimize the internal resistance.

A metal thin plate used as a current collector is susceptible to oxidation. That is, an oxide layer is formed on the metal thin plate. Particularly, when an aluminum thin plate is used as a current collector, an alumina layer is formed on the surface of the plate. The alumina is an electrically nonconductive material, which increases the internal resistance of the supercapacitor.

DISCLOSURE OF INVENTION

Technical Problem

An object of the present invention is to provide a supercapacitor with reduced internal resistance.

Another object of the present invention is to provide a supercapacitor having a conductive metal oxide layer on a surface of an aluminum thin plate which reduces an internal resistance and prevents forming a nonconductive layer on the surface of the aluminum thin plate.

Other object of the present invention is to provide an electrochemical capacitor having improved adhesion of an electrode active material to a current collector to give an enhanced charge capacitance.

Technical Solution

The supercapacitor according to the present invention comprises two electrodes in which each of the two electrodes is comprised of an electrode active material and a current collector to which the electrode active material is adhered, a separator positioned between the two electrodes, an electrolyte and a package, wherein the current collector is a metal thin plate having a conductive metal oxide layer thereon and the electrode active material is adhered on a surface of the conductive metal oxide layer.

ADVANTAGEOUS EFFECTS

The supercapacitor comprising a current collector which has a structure in which a conductive metal oxide layer is formed on an aluminum thin plate has a significantly reduced internal resistance. In addition, any chemical etching or sand polishing which increases a surface area of the current collector is not required, because the conductive metal oxide layer formed on the surface of the aluminum thin plate has a rough surface. The rough surface also increases the adhesion ability of an electrode active material. The supercapacitor according to the present invention can be effectively applicable to a system requiring high energy in a short time, such as electric vehicles.

BEST MODE FOR CARRYING OUT THE INVENTION

According to a preferred embodiment of the present invention, there is provided a supercapacitor according which comprises two electrodes in which each of the two electrodes is comprised of an electrode active material and a current collector to which the electrode active material is adhered, a separator positioned between the two electrodes, an electrolyte and a package, wherein the current collector is a metal thin plate having a conductive metal oxide layer thereon and the electrode active material is adhered on a surface of the conductive metal oxide layer.

MODE FOR THE INVENTION

The present invention relates to a supercapacitor comprising two electrodes in which each of the two electrodes is comprised of an electrode active material and a current collector to which the electrode active material is adhered, a separator positioned between the two electrodes, an electrolyte and a package, wherein the current collector is a metal thin plate having a conductive metal oxide layer thereon and the electrode active material is adhered on a surface of the conductive metal oxide layer.

Specifically, the electrode is comprised of a current collector and an electrode active material coated on the surface of the current collector, and the current collector has a structure in which a conductive metal oxide layer is formed on the surface of a metal thin plate. Of two electrodes of the supercapacitor, at least one is the electrode having said structure. Preferably, both of the two electrodes have said structure.

Preferable metal thin plate is an aluminum thin plate which is being wildly used. The formation of the conductive metal oxide layer on the surface of the metal thin plate can be accomplished by various methods. For example, an immersion coating may be mentioned. The immersion coating comprises dipping the metal thin plate into a solution in which a conductive metal oxide such as zinc oxide is dissolved into a suitable solvent, followed by drying with hot wind to provide the metal thin plate having a conductive metal oxide layer thereon. For example, formation of zinc oxide layer on an aluminum thin plate can be accomplished by dipping a pre-cleaned aluminum thin plate into an aqueous zinc oxide solution in order to form a zinc coating layer on the surface of the aluminum thin plate through a redox reaction, and then drying the obtained thin plate with hot wind. Preferable coating solution is a basic aqueous solution into which zinc oxide is dissolved. Addition of a base such as sodium hydroxide provides homogeneous dissolution of zinc oxide into an aqueous solution. During the dipping process, a redox reaction takes place at a surface of the aluminum thin plate, and as a result thereof, a zinc coating layer is formed on the surface of the aluminum thin plate. Thereafter, the aluminum thin plate having the zinc coating layer is subjected to a hot wind drying. During the drying process, the most outer surface of the zinc coating is oxidized to provide a zinc oxide protective layer. The zinc oxide outer layer prevents an internal layer from dissolving out, like a conventional alumina layer present on a surface of an aluminum current collector. Additionally, the zinc oxide outer layer has an even higher conductivity as much as $10^{14}$ than the alumina, which significantly reduces the internal resistance of the supercapacitor.

The metal thin plate includes an etched foil, an expanded metal grid and a perforated foil grid. The aluminum thin plate is preferably pre-cleaned in order to remove alumina or other impurities which may be present on the surface of the aluminum thin plate. The pre-cleaning process may be carried out as already known in the art. For example, a nonconductive alumina surface layer is removed from the aluminum thin layer by contacting it with a basic solution containing sodium hydroxide or an acidic solution containing acetic acid. The pre-cleaning process is carried out by dipping the aluminum thin plate into the cleaning solution for 10~150 sec. If necessary, the aluminum thin plate can be additionally dipped into an activation solution containing fluoride for 5~30 sec in order to activate the surface of the aluminum thin plate. The aluminum thin plate may be washed with an organic solution such as a ketone including an acetone, or an alcohol in order to remove organic impurities from the surface of the aluminum thin plate.

The conductive metal oxide layer formed on the surface of the metal thin plate through the coating process has a rough surface, and this enhances adhesion of the electrode active material such as activated carbon to the surface of the current collector, and improves the performance of the supercapacitor.

The conductive metal oxide layer can be formed of an oxide of an amphoteric element such as zinc or tin. According to the preferred embodiment of the present invention, the zinc oxide was found to give a highly reduced internal resistance and did not involve any problem caused by dissolution out from the surface of the aluminum thin plate, compared to a lithium secondary battery involving a chemical reaction which results dissolution out of the zinc oxide from an aluminum thin plate.

Adhesion of the electrode active material to the conductive metal oxide layer is carried out in a manner as well known in the art. Please refer to U.S. Pat. Nos. 4,737,899, 5,351,164, 4,717,595, 5,136,473 and 5,369,547. A preferable example of the electrode active material is activated carbon. The activated carbon is adhered in combination with a current conductor to the conductive metal oxide layer with aid of a binder. Herein, any pre-treatment of the current collector, such as etching or sand-polishing, was not required, compared to the conventional technologies. The reason is that the conductive metal oxide layer formed by the immersion coating had a sufficiently enhanced specific surface area, and as a result thereof, the adhesion of the electrode active material was sufficiently improved.

The present invention will be more fully illustrated referring to the following Examples. However, it should be understood that these Examples are suggested only for illustration and should not be construed to limit the scope of the present invention. Numerous modifications could be made without departing from the scope and the spirit of the invention.

EXAMPLE 1

Etched aluminum thin plate (JCC brand, Japan) having a thickness of about 30 micron was firstly washed with an acetone. Thereafter, the aluminum thin plate was dipped into an aqueous cleaning solution containing 40 g/L of sodium hydroxide for about 40 sec in order to remove an alumina outer layer from the aluminum thin plate. The pre-cleaned aluminum thin plate was taken out from the cleaning solution and then dipped into a coating solution containing 100 g/L of zinc oxide (Aldrich Chemical Company) and 500 g/L of sodium hydroxide for 8 sec in order to form a zinc thin layer on the outer surface of the aluminum thin plate. The aluminum thin layer was taken out from the coating solution, washed with a distilled water and dried with a stream of 80° C. of a hot air. During hot wind drying, the zinc coated on the aluminum thin plate was oxidized to form a zinc oxide protective layer at the outer surface.

On the aluminum thin plate having a zinc oxide layer thereon, a slurry of an activated carbon was coated, dried and pressed in order to provide an electrode. The slurry of the activated carbon was obtained from 4 weight part of carboxymethylcellulose (CMC), 4 weight part of styrene-butadiene rubber (SBR), 4 weight part of polytetrafluorethylene (PTEE), 10 weight part of an activated carbon powder and 2 weight part of carbon black as a current conductor. As a separator, a porous paper was positioned between two electrodes, and the assembly was inserted into a pouch of a package. An electrolyte solution prepared by dissolving IM $Et_4NBF_4$ into a propylene carbonate solvent was injected into the pouch to provide a supercapacitor having a type of an electric double layer.

EXAMPLE 2-5

Electric double layer supercapacitors were prepared in the same manner as described in Example 1 except that the composition and the dipping time was fixed as shown in Table 1.

EXAMPLE 6

An electric double layer supercapacitor was prepared in the same manner as described in Example 1 except that an ordinary aluminum thin plate was used instead of the etched thin plate.

EXAMPLE 7

An aluminum thin plate (JCC brand, Japan) having a thickness of about 30 micron was firstly washed with an acetone. Thereafter, the aluminum thin plate was dipped into an aqueous cleaning solution containing 40 g/L of sodium hydroxide for about 40 sec in order to remove an alumina outer layer from the aluminum thin plate. The pre-cleaned aluminum thin plate was taken out from the cleaning solution and then dipped into a coating solution containing 45 g/L of sodium stannate for 30 sec at a temperature of 65~80° C. in order to form a tin thin layer on the outer surface of the aluminum thin plate. The aluminum thin layer was taken out from the coating solution, washed with a distilled water and dried with a stream of 80° C. of a hot wind. During hot wind drying, the tin coated on the aluminum thin plate was oxidized to form a tin oxide protective layer on the outer surface.

On the aluminum thin plate having a tin oxide layer thereon, a slurry of an activated carbon was coated, dried and pressed in order to provide an electrode. The slurry of the activated carbon was obtained from 4 weight part of carboxymethylcellulose (CMC), 4 weight part of styrene-butadiene rubber (SBR), 4 weight part of polytetrafluorethylene (PTEE), 10 weight part of an activated carbon powder and 2 weight part of carbon black as a current conductor. As a separator, a porous paper was positioned between two electrodes, and the assembly was inserted into a pouch of a package. An electrolyte solution prepared by dissolving IM $Et_4NBF_4$ into a propylene carbonate solvent was injected into the pouch to provide a supercapacitor having a type of an electric double layer.

EXAMPLE 8

An electric double layer supercapacitor was prepared in the same manner as described in Example 7 except that a coating solution containing 60 g/L of sodium stannate was used instead of the coating solution containing 45 g/L of sodium stannate and that the dipping time was adjusted to 20 sec.

COMPARATIVE EXAMPLE 1

For the purpose of comparison, an electric double layer supercapacitor was prepared in the same manner as described in Example 7 except that a zinc coating treatment was not performed.

EXPERIMENTAL EXAMPLE

Using the supercapacitors obtained from Examples 1 to 8 and comparative example 1, electrode density, charge capacity and internal resistance were measured, and results thereof were summarized in Table 1:

TABLE 1

|  | Experimental condition | Dipping time (sec) | Electrode density (g/□) | Initial capacitance (F) and resistance (mΩ) | Capacitance and resistance after 1000 h at 80° C. |
|---|---|---|---|---|---|
| Example 1 | zinc oxide 100 g/L sodium hydroxide 500 g/L | 8 | 0.60 | 55, 10 | 53, 12 |
| Example 2 | zinc oxide 50 g/L sodium hydroxide 300 g/L | 60 | 0.60 | 55, 12 | 53, 13 |
| Example 3 | zinc oxide 30 g/L sodium hydroxide 300 g/L | 200 | 0.61 | 55, 12 | 53, 13 |
| Example 4 | zinc oxide 130 g/L sodium hydroxide 600 g/L | 30 | 0.60 | 55, 9 | 53, 11 |
| Example 5 | zinc oxide 100 g/L sodium hydroxide 500 g/L | 40 | 0.62 | 55, 9 | 53, 11 |
| Example 6 | zinc oxide 100 g/L sodium hydroxide 500 g/L | 8 | 0.59 | 54, 9 | 53, 11 |
| Example 7 | sodium stannate 45 g/L | 30 | 0.63 | 53, 15 | 52, 18 |
| Example 8 | sodium stannate 60 g/L | 20 | 0.63 | 53, 16 | 51, 20 |
| Comparative Example 1 | no treatment |  | 0.59 | 50, 25 | 45, 40 |

As shown in Table 1, each of the supercapacitors of Example 1 to 8 had a significantly reduced internal resistance, compared with the supercapacitor of the comparative Example 1. Furthermore, the internal resistance and the capacitance did not practically reduced even after exposure to a harsh condition, at a temperature of 80° C. for 100 h. This implies that the conductive metal oxide layer was not damaged from repeated charge and discharge through a physical absorption, and that the conductive metal oxide layer effectively prevented an oxidation of the aluminum present at the internal layer.

The invention claimed is:

1. A supercapacitor which comprises two electrodes in which each of the two electrodes is comprised of a current collector and an electrode active material adhered to the current collector, a separator positioned between the two electrodes, an electrolyte and a package, wherein the current collector is a metal thin plate having a conductive metal oxide layer thereon, the electrode active material is adhered on a surface of the conductive metal oxide layer and the conductive metal oxide layer is formed of zinc oxide.

* * * * *